United States Patent
Karrotu et al.

(10) Patent No.: US 9,715,436 B2
(45) Date of Patent: Jul. 25, 2017

(54) SYSTEM AND METHOD FOR MANAGING RAID STORAGE SYSTEM HAVING A HOT SPARE DRIVE

(71) Applicant: DELL PRODUCTS, L.P., Round Rock, TX (US)

(72) Inventors: Vishnu Murty Karrotu, Bangalore (IN); Kavi K. Chakkravarthy, Vellore (IN); Neeraj Joshi, Puducherry (IN)

(73) Assignee: Dell Products, L.P., Round Rock, TX (US)

( * ) Notice: Subject to any disclaimer, the term of this patent is extended or adjusted under 35 U.S.C. 154(b) by 227 days.

(21) Appl. No.: 14/732,375

(22) Filed: Jun. 5, 2015

(65) Prior Publication Data

US 2016/0357649 A1  Dec. 8, 2016

(51) Int. Cl.
*G06F 11/00* (2006.01)
*G06F 11/20* (2006.01)
*G06F 11/16* (2006.01)

(52) U.S. Cl.
CPC ...... *G06F 11/2094* (2013.01); *G06F 11/1662* (2013.01); *G06F 2201/805* (2013.01)

(58) Field of Classification Search
CPC ............ G06F 11/2094; G06F 11/1662; G06F 2201/805
See application file for complete search history.

(56) References Cited

U.S. PATENT DOCUMENTS

| | | | | |
|---|---|---|---|---|
| 6,154,853 A | * | 11/2000 | Kedem | G06F 11/1084 711/114 |
| 2005/0193273 A1 | * | 9/2005 | Burkey | G06F 11/1092 714/42 |
| 2006/0143503 A1 | * | 6/2006 | Shaik | G06F 3/061 714/6.2 |
| 2009/0265510 A1 | | 10/2009 | Walther et al. | |
| 2012/0226935 A1 | * | 9/2012 | Kishore | G06F 11/2094 714/6.23 |
| 2014/0149787 A1 | | 5/2014 | Shanbhag et al. | |
| 2014/0215147 A1 | | 7/2014 | Pan | |
| 2014/0281689 A1 | | 9/2014 | Fischer | |

* cited by examiner

*Primary Examiner* — Bryce Bonzo
*Assistant Examiner* — Jonathan Gibson
(74) *Attorney, Agent, or Firm* — Isidore PLLC (57) ABSTRACT

A method provides rebuilding data in a hot spare storage device when multiple storage devices fail in a storage system. The method includes a storage controller determining if a first storage device storing first data has failed within a first group of storage devices. In response to the first storage device failing, the first data is rebuilt in the hot spare storage device from a copy of the first data stored in a first mirrored storage device of the first group of storage devices. In response to a second storage device failing, third data is generated by performing a first exclusive or (XOR) operation with the first data stored on the hot spare storage device and a copy of the second data stored in a second mirrored storage device of the second group of storage devices. The third data is rebuilt in the hot spare storage device. The method recovers original data and prevents complete failure of a virtual disk.

22 Claims, 9 Drawing Sheets

SYSTEM AND METHOD FOR MANAGING RAID STORAGE SYSTEM HAVING A HOT SPARE DRIVE

BACKGROUND

1. Technical Field

The present disclosure generally relates to data storage systems and in particular to a method of operating a redundant array of independent drives (RAID) storage system having a hot spare storage device.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. Both local computer storage systems and remote or cloud storage systems can include redundant arrays of independent drives (RAID) that use hard disk drives or solid state storage drives. The drives can be configured to have different redundancy levels depending upon the amount of redundancy required.

A RAID 1 system has data disks for storing data and an equal number of additional "mirror" disks for storing copies of the information written to the data disks, achieving replication of data between disks. RAID 10 uses a combination of RAID 0 and RAID 1 levels. RAID 10 provides data striping in mirrored drives. Unfortunately, in RAID systems, if two or more drives fail in a group of mirrored drives, data can be lost.

BRIEF SUMMARY

Disclosed are a method, a storage system and an information handling system (IHS) that (1) rebuilds data in a hot spare storage device when multiple storage devices fail in a storage system and (2) rebuilds data in a hot spare storage device after a failed storage device has been replaced with a new storage device.

According to one embodiment, the method comprises a storage controller determining if a first storage device storing first data has failed within a first group of storage devices. In response to the first storage device failing, the first data is rebuilt in a hot spare storage device from a copy of the first data stored in a first mirrored storage device of the first group of storage devices. The method further determines if a second storage device storing second data has failed within a second group of storage devices. In response to the second storage device failing, third data is generated by performing a first exclusive or (XOR) operation with the first data stored on the hot spare storage device and a copy of the second data stored in a second mirrored storage device of the second group of storage devices. The third data is rebuilt in the same hot spare storage device by overwriting the first data. The third data holds the parity data of one or more failed devices in one or more groups or degraded spans. The parity data is used by some RAID levels such as RAIDS, 6, 50 & 60 to achieve redundancy. If a drive in the array fails, remaining data on the other drives can be combined with the parity data using a Boolean XOR function) to reconstruct the missing data. The same hot spare SD will be used for storing the rebuilt data by overwriting the existing data and will hold the parity data of any groups or spans with failed storage devices.

Also disclosed is a storage system comprising a plurality of storage devices, a hot spare storage device, and a storage controller coupled to the storage devices and the hot spare storage device for controlling storage operations. The storage controller comprises logic that determines if a first storage device storing first data has failed within a first group of storage devices. In response to the first storage device failing, the first data is rebuilt in the hot spare storage device from a copy of the first data stored in a first mirrored storage device of the first group of storage devices. The storage controller determines if a second storage device storing second data has failed within a second group of storage devices. In response to the second storage device failing, third data is generated by performing a first exclusive or (XOR) operation with the first data stored on the hot spare storage device and a copy of the second data stored in a second mirrored storage device of the second group of storage devices. The storage controller rebuilds the third data in the hot spare storage device. The third data holds the parity data of one or more failed devices in one or more groups or degraded spans. The hot spare storage device has sufficient storage space to hold new rebuilt data from a plurality of failed storage devices of degraded spans by performing an exclusive OR (XOR) operation of all failed drives in a group from its mirrored pair drive with already available data of the hot spare drive.

Also disclosed is an information handling system (IHS) comprising one or more processors and a storage system in communication with the processor. The storage system comprises a plurality of storage devices, a hot spare storage device and a storage controller coupled to the storage devices and the hot spare storage device. The storage controller has firmware executing thereon to provide control of storage system operations. The firmware configures the storage controller to determine if a first storage device storing first data has failed within a first group of storage devices. In response to the first storage device failing, the first data is rebuilt in the hot spare storage device from a copy of the first data stored in a first mirrored storage device of the first group of storage devices. The storage controller determines if a second storage device storing second data has failed within a second group of storage devices. In response to the second storage device failing, third data is generated by performing a first exclusive or (XOR) operation with the first data stored on the hot spare storage device and a copy of the second data stored in a second mirrored storage device of the second group of storage devices. The third data is new data of the failed stripes to be rebuilt as new hot spare data in the hot spare storage device. The storage controller rebuilds the third data or computed new data in the same hot spare storage device. The third data holds the parity data of one or more failed devices in one or more groups or degraded spans. The hot spare storage device has sufficient storage space to hold new rebuilt data from a plurality of failed storage devices of degraded spans by performing an exclusive OR (XOR) operation of all failed drives in a group from its mirrored pair drive with already available data of the hot spare drive.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system (IHS), a storage system and a method performed within the information handling system that (1) rebuilds data in a hot spare storage device when multiple storage devices fail in a storage system and (2) rebuilds data in a hot spare storage device after a failed storage device has been replaced with a new storage device.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
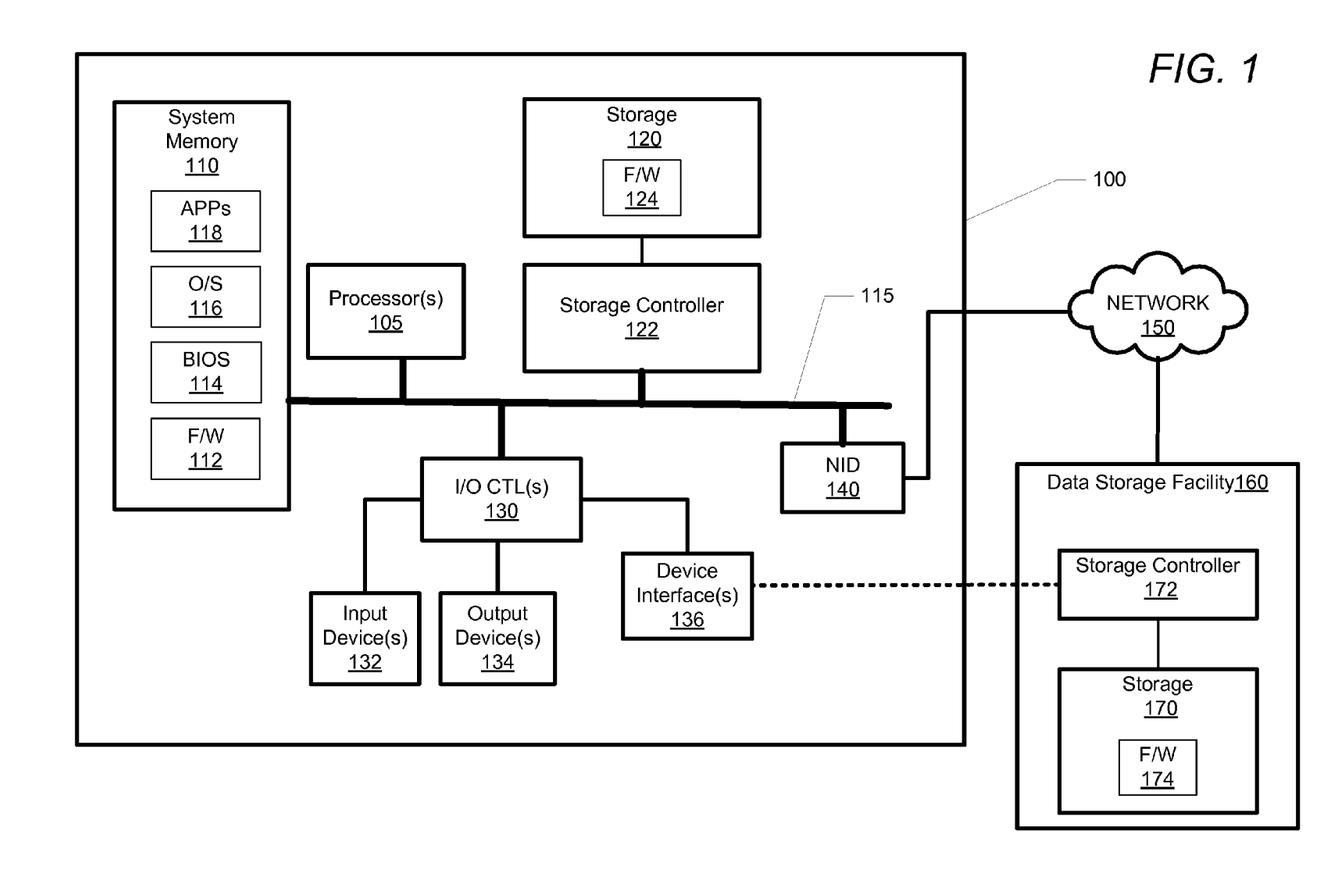
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a storage controller 122 coupled to storage 120 within which can be stored software and/or firmware 124 and one or more sets of data (not specifically shown). As shown, system memory 110 can include therein a plurality of modules, including firmware (F/W) 112, basic input/output system (BIOS) 114, operating system (O/S) 116 and application(s) 118. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s), such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as I²C, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of hard disk drives, solid state storage drives, solid state storage devices or other storage media. In one embodiment, data storage facility 160 is a redundant array of independent storage drives or hard drives (RAID). Data storage facility 160 includes a storage controller 172 coupled to storage 170 within which can be stored software and/or firmware 174 and one or more sets of data (not specifically shown). In an alternate embodiment, and as represented by the second set of dashed interconnecting lines, data storage facility 160 can be directly connected to IHS 100 as an external storage device.

Figure 2:
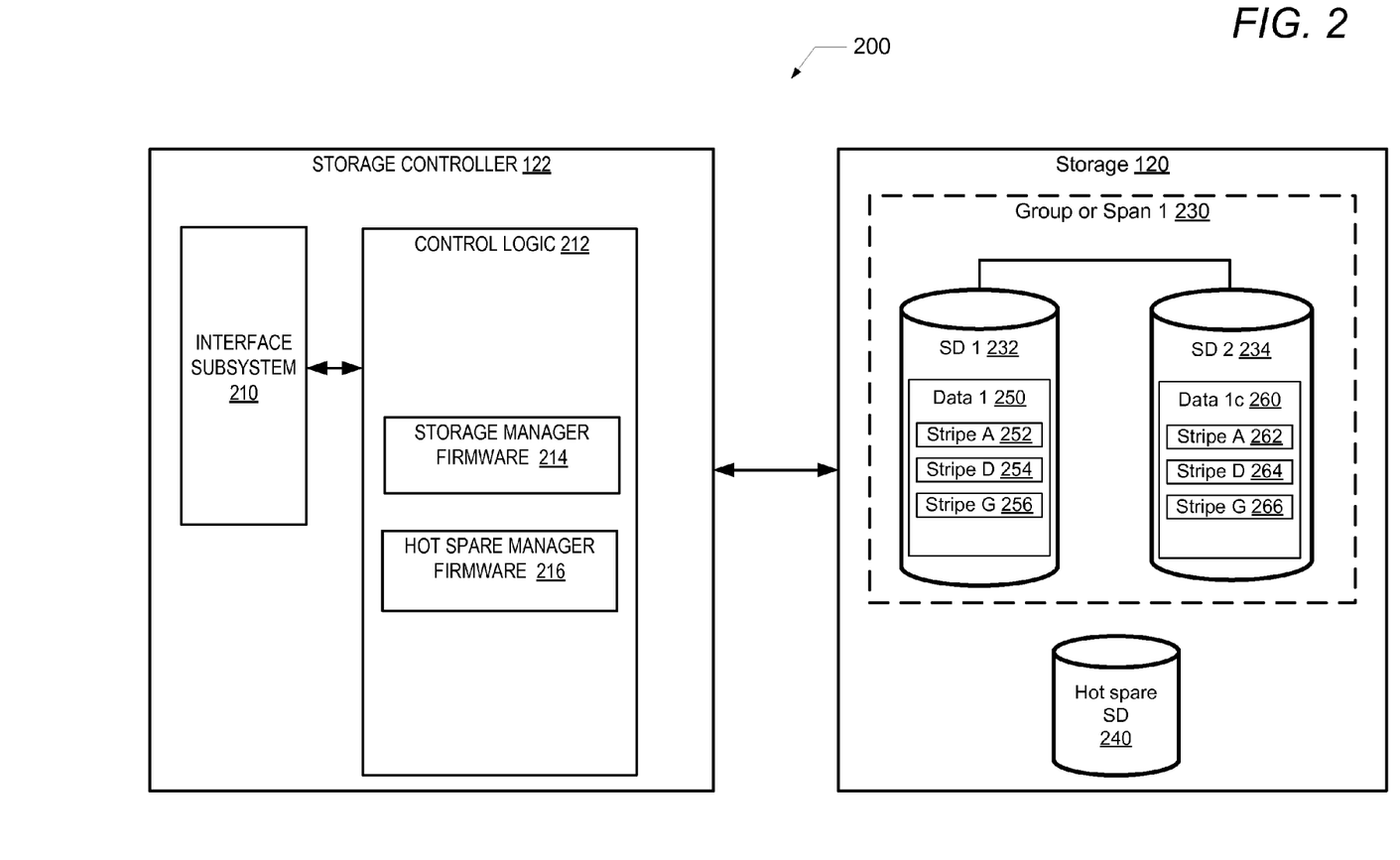
FIG. 2 illustrates a block diagram of an example storage system, in accordance with one or more embodiments.

With reference now to FIG. 2, there is illustrated one embodiment of storage subsystem 200 that can be utilized within IHS 100 and/or data facility 160 to store data, software and firmware. In the discussion of FIG. 2, reference is also made to elements described in FIG. 1. Storage subsystem 200 generally includes storage 120 and storage controller 122 that controls and manages the flow of commands and data to and from storage 120. Storage subsystem 200 can also represent storage 170 and storage controller 172 of data storage facility 160.

In one embodiment, storage 120 comprises a group or span 1 230 of RAID storage devices (SD) or storage drives including SD 1 232 and SD 2 234. While two drives are shown, more or fewer drives can be utilized within group or span 1 230. SD 2 234 contains a copy or mirror image of the data stored in SD 1 232. In some embodiments, storage 120 can include hundreds of groups or spans including many SDs, hard disk drives or solid state drives in each span. SD 1 232 and SD 2 234 are shown storing data in a RAID 1 format. In a RAID 10 format, data is distributed in stripes and copied or mirrored onto a redundant storage device. Striping distributes the contents of files roughly equally among all disks in a set of storage devices. SD 1 232 stores data 1 250 that is comprised of stripe A 252, stripe D 254 and stripe G 256. SD 2 234 stores data 1c 260 that is comprised of stripe A 262, stripe D 264 and stripe G 266. SD 2 234 is a mirror of SD 1 232 (i.e., data 1c 260 is a copy of data 1 250).

Storage 120 further includes one or more hot spare storage device(s) 240. Hot spare storage device 240 is a storage device that is used to replace a failing or failed storage device in a RAID system. The hot spare disk reduces the mean time to recovery for the RAID redundancy group, thus reducing the probability of a second disk failure and the resultant data loss that would occur in any singly redundant RAID system such as a RAID 1 or RAID 10 system. For example, hot spare storage device 240 can replace either or both of SD 1 232 or SD 2 234 if the storage devices were to fail. Each of the storage devices 232, 234 and 240 can store a wide variety of information and data. According to one aspect of the disclosure, the hot spare storage device 240 is used to store rebuilt data by overwriting the existing data and storing the data of any degraded spans (i.e., group or span 1 230).

Storage controller 122 contains the logic necessary to read and write to storage 120. Storage controller 122 comprises interface subsystem 210 and control logic 212. Interface subsystem 210 manages communications between control logic 212 of data storage facility 160 and system interconnect 115 (FIG. 1). Control logic 212 comprises several functional modules or processes including storage manager firmware 214 and hot spare manager firmware 216. Each of the storage controller components can communicate with each other via a communication fabric, which includes specific messaging signals communicated over specific signal lines (not illustrated). Functions, modules, routines, methods and processes of the present disclosure can be provided as firmware code and/or logic within storage controller 122. The firmware code and logic can implement storage manager firmware 214 and hot spare manager firmware 216.

Storage manager firmware 214 manages the reading and writing of data to storage 120 and can include data distribution techniques to improve storage reliability such as RAID. Storage manager firmware 214 uses RAID technology to group the drives within storage 120 into RAID sets. Hot spare manager firmware 216 manages the rebuilding of data in hot spare storage device 240 when one or more storage devices within storage 120 fail.

Those of ordinary skill in the art will appreciate that the hardware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

FIGS. 3-7 illustrate details of example storage systems 300, 400, 500, 600 and 700 in which one or more storage devices have failed and the data from the failed storage device has been rebuilt in hot spare SD 240. In the discussion of FIGS. 3-7, reference is also made to elements described in FIG. 1 and FIG. 2 and the preceding FIGS. Turning to FIG. 3, storage system 300 includes several spans including span 1 230, span 2 330 and span 3 350. All of the spans and their respective storage devices within each span are communicatively coupled to storage controller 122. Span 2 330 includes SD 3 332 that stores data 2 340 and SD 4 334 that stores data 2c 342. Data 2 340 and data 2c 342 can store additional stripes of RAID data such as stripes B, E and H. Span 3 350 includes SD 5 352 that stores data 3 360 and SD 6 354 that stores data 3c 362. Data 3 360 and data 3c 362 can store additional stripes of RAID data such as stripes C, F and I.

Figure 3:
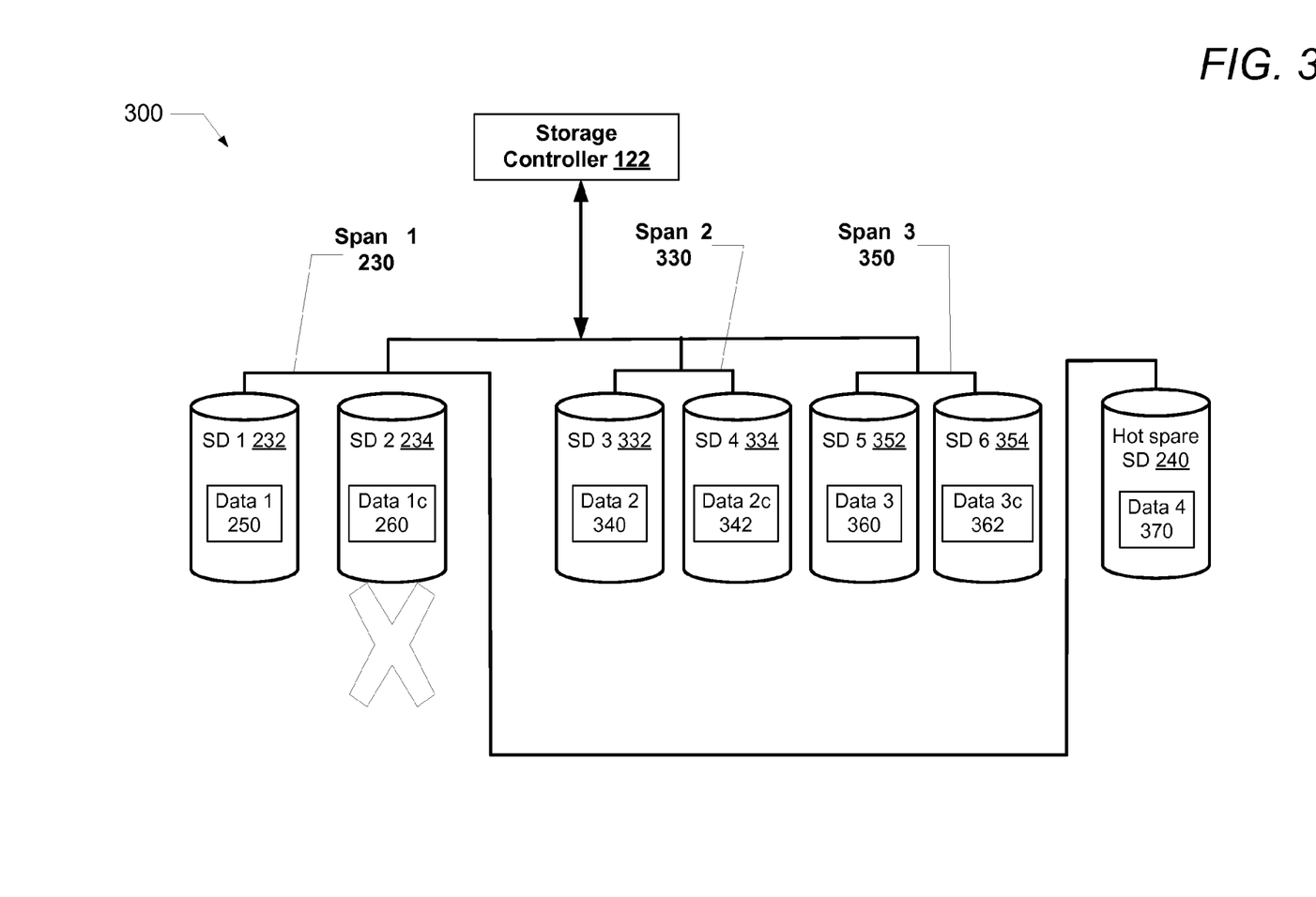
FIG. 3 illustrates an example RAID storage system in which one storage device has failed in a single span and the data from the failed storage device has been rebuilt in a hot spare storage device, in accordance with one or more embodiments.

As shown in FIG. 3, when one SD in a single span of storage system 300 fails, such as SD 2 234, storage controller 122 executes hot spare manager firmware 216, which retrieves a copy of the data (data 1 250) stored in SD 1 232 and rebuilds data 1c 260 in the hot spare SD 240 as data 4 370. Data 4 370 stored in hot spare SD 240 now contains the same data as the failed storage device. Storage controller 122 can then access the copied data (previously stored on the failed storage device) via hot spare SD 240.

Figure 4:
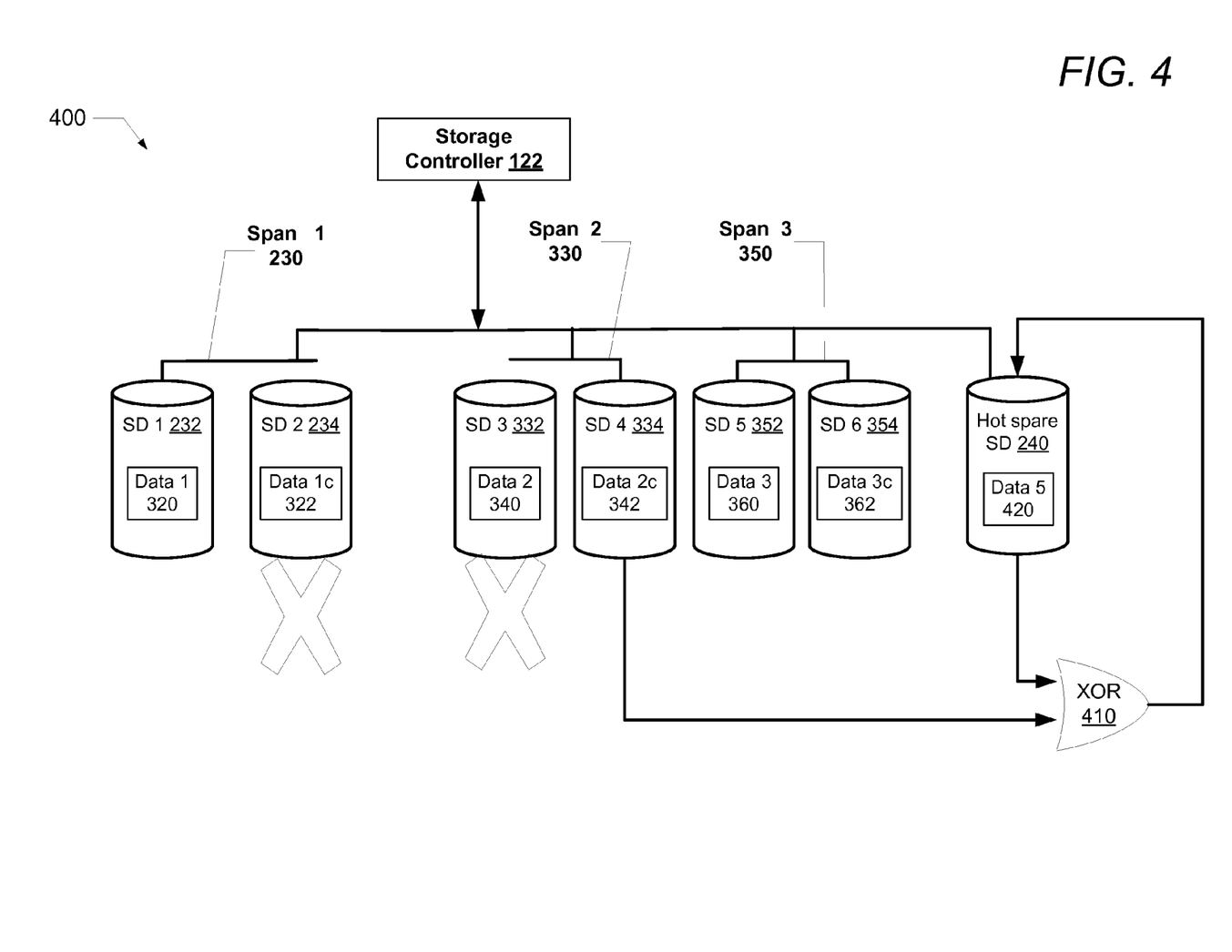
FIG. 4 illustrates an example RAID storage system in which one storage device has failed in each of two spans, and the data from the failed storage devices have been rebuilt in a hot spare storage device, in accordance with one or more embodiments.

FIG. 4 illustrates a storage system 400 where a storage device has failed in each of two spans. SD 2 234 of span 1 230 has failed and subsequently SD 3 332 of span 2 330 has failed. After detecting the failure of another storage device (i.e., a second failure, concurrently with or subsequently to the first failure in span 1 230), storage controller 122, executing hot spare manager firmware 216, generates data 5 420 by performing a first exclusive or (XOR) operation 410 with data 4 370 (FIG. 3) previously rebuilt in hot spare SD 240 and a copy of the data (data 2c 342) stored in mirrored SD 4 334. The storage controller 122 rebuilds the resulting parity data 5 420 in hot spare SD 240. The data resulting from the XOR operation 410 is called parity data and the data contained in data 5 420 depends on the input data to the XOR operation used to recover the original failed SD data.

The rebuilding operation overwrites the existing data in hot spare SD 240. XOR operation 410 removes any data that are redundant between SD 1 232 (data 1 320) and SD 4 334 (data 2c 342). After the rebuilding operation, parity data 5 420 stored in hot spare SD 240 now contains parity data and storage controller 122 is able to recover the original data from the parity data of failed SDs, SD 2 234 and SD 3 332, with no duplication of data. The parity data is able to recover the original data from the parity data later. Storage controller 122 can then access the copied data (previously stored on the failed storage devices) via hot spare SD 240.

Figure 5:
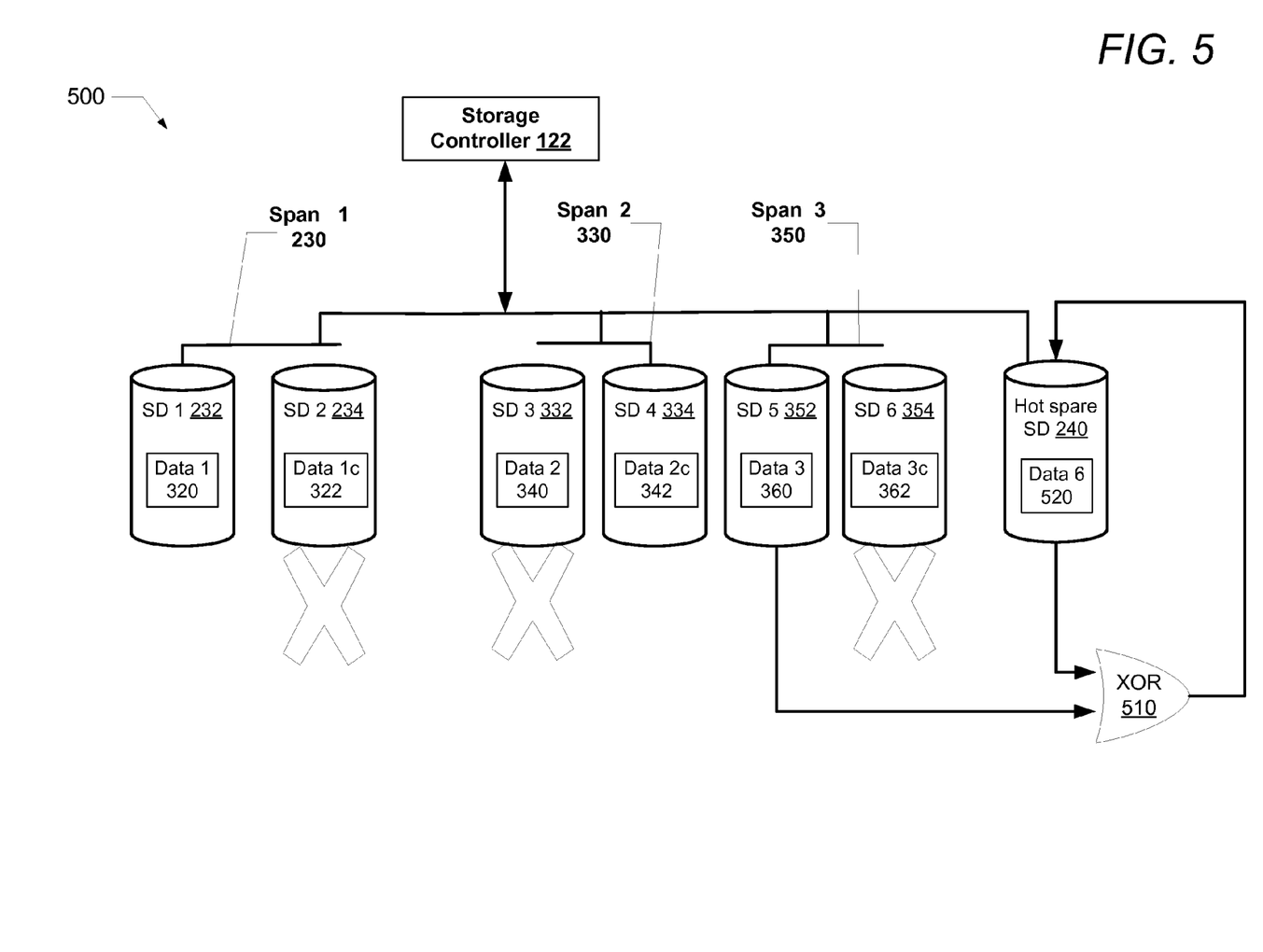
FIG. 5 illustrates an example RAID storage system in which one storage device has failed in each of three spans, and the data from the failed storage devices have been rebuilt in a hot spare storage device, in accordance with one or more embodiments.

FIG. 5 illustrates a storage system 500 where an additional SD has failed in another span such that each of the three spans contains a failed SD. For example, SD 2 234 of span 1 230 has failed and subsequently SD 3 332 of span 2 330 has failed and subsequently SD 6 354 of span 3 350 has failed. After detecting the failure of another storage device, storage controller 122, executing hot spare manager firmware 216, generates data 6 520 by performing a second XOR operation 510 with data 5 420 (FIG. 4) previously rebuilt in hot spare SD 240 and a copy of the data (data 3 360) stored in SD 5 352. The storage controller 122 rebuilds the resulting parity data 6 520 in hot spare SD 240. XOR operation 510 removes any data that are redundant between SD 1 232 (data 1 320), SD 4 334 (data 2c 342) and SD 5 352 (data 3 360). After the rebuilding operation, parity data 6 520 stored in hot spare SD 240 now contains parity data and storage controller 122 is able to recover the original data from the failed SDs, SD 2 234, SD 3 332, and SD 5 352 with no duplication of data. The parity data is able to recover the original data from parity data later. Storage controller 122 can access the data from the failed storage devices via hot spare SD 240.

Figure 6:
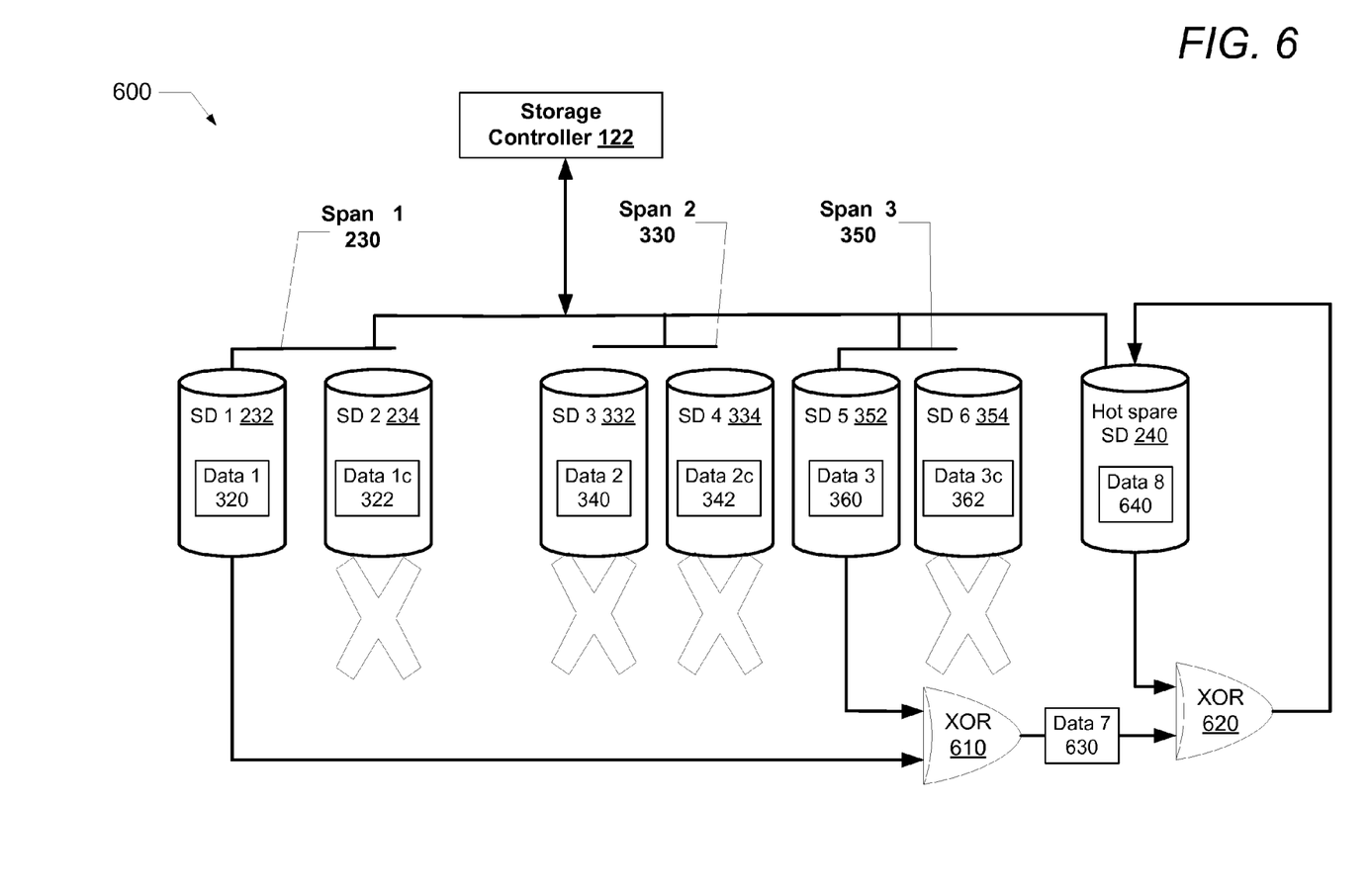
FIG. 6 illustrates an example RAID storage system in which all of the storage devices have failed in one span and one storage device has failed in each of two additional spans and the data from the failed storage devices has been rebuilt in a hot spare storage device, in accordance with one or more embodiments.

FIG. 6 illustrates a storage system 600 where an additional SD has failed in a span that already has a failed SD such that one of the spans contains no functional storage devices. In this example, SD 2 234 of span 1 230 has failed, followed by SD 3 332 of span 2 330, then SD 6 354 of span 3 350, and subsequently SD 4 334 of span 2 330. After detecting the failure of another storage device, storage controller 122, executing hot spare manager firmware 216, generates data 7 630 by performing a third XOR operation 610 with data 1 320 stored in SD 1 232 and data 3 360 stored in SD 5 352. Data 8 640 is then generated by performing a fourth XOR operation 620 with data 7 630 from XOR operation 610 and data 6 520 (FIG. 5) previously rebuilt in hot spare SD 240. The storage controller 122 rebuilds the resulting data 8 640 in hot spare SD 240. The data 8 640 has the same data of either data 2 340 or data 2c 342, by performing XOR operation of data 7 630 and data 6 520. The parity data is data 7 630 or data 6 520 and via the use of Boolean XOR function 610 and 620 is able to recover the Span 2 330 drive data, that is data 8 640 or data 2 340 or data 2c 342. Thereby hot spare SD 240 acts as Span 2 340 after completion of the rebuilding operation. XOR operations 610 and 620 remove any data that are redundant between the failed drives. After the rebuilding operation, data 8 640 stored in hot spare SD 240 now contains the same data as the failed SDs, SD 2 234, SD 3 332, SD 4 334 and SD 5 352, with no duplication of data. However, now there is no redundancy of data for data 2 342. Storage controller 122 can access the data from the failed storage devices via hot spare SD 240.

Figure 7:
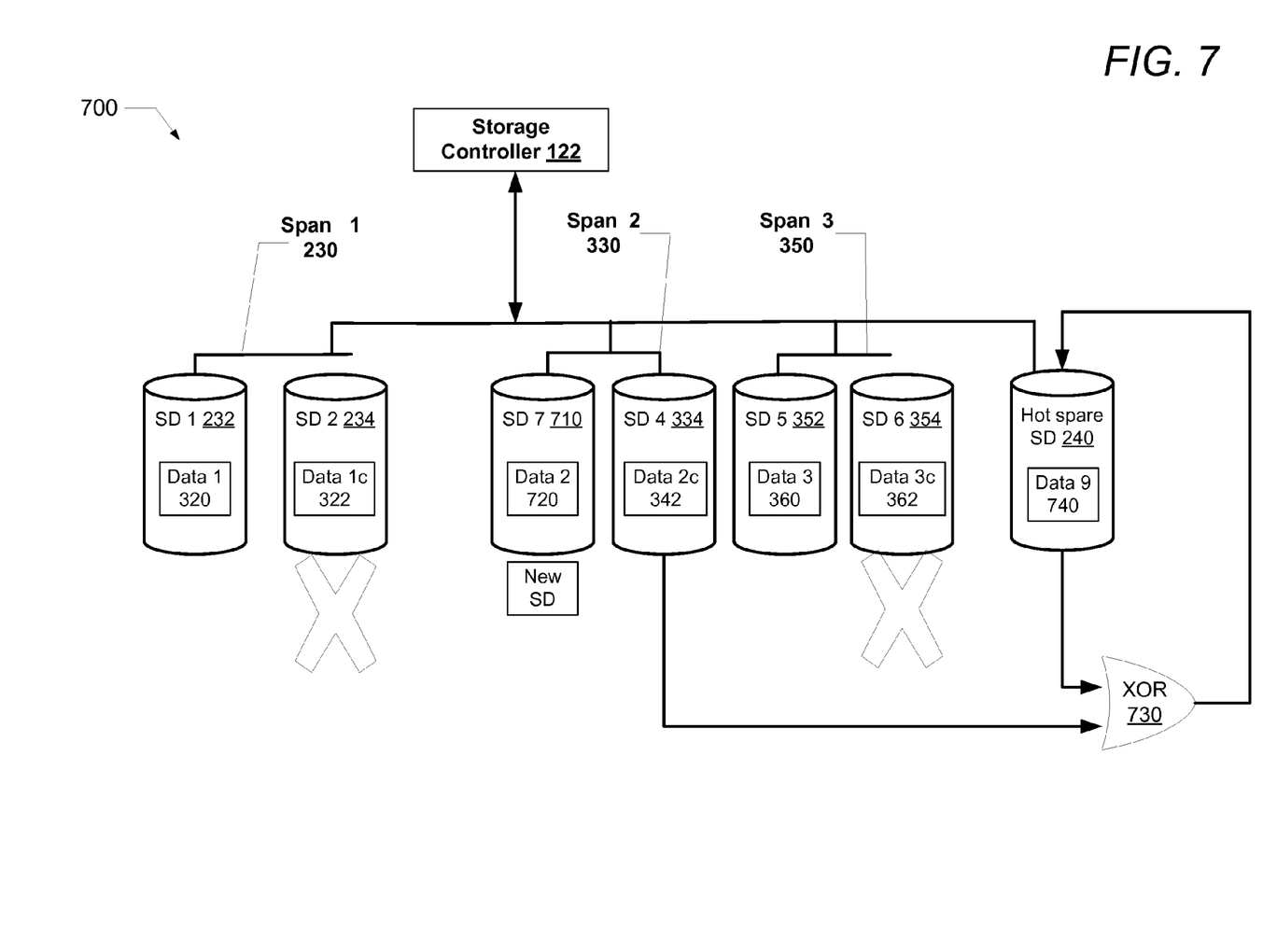
FIG. 7 illustrates an example RAID storage system in which a failed storage device has been replaced with a new storage device in one span and the data has been rebuilt in a hot spare storage device, in accordance with one or more embodiments.

FIG. 7 illustrates a storage system 700 where the failed SD 3 332 of FIG. 5 has been replaced with a new functional SD 7 710. After SD 7 710 has been replaced, storage controller 122, executing hot spare manager firmware 216, detects the new SD and copies data 2c 342 stored in SD 4 334 to SD 7 710 as data 2 720. The storage controller 122 generates data 9 740 by performing a fifth XOR operation 730 with data 6 520 (FIG. 5) previously rebuilt in hot spare SD 240 and data 2c 342 stored in SD 4 324. The storage controller 122 rebuilds the resulting data 9 740 in hot spare SD 240. XOR operation 730 removes data 2c 342 from hot spare SD 240, since data 2 is now redundant in both of SD 7 710 and SD 4 334 of span 2 330.

Figure 8:
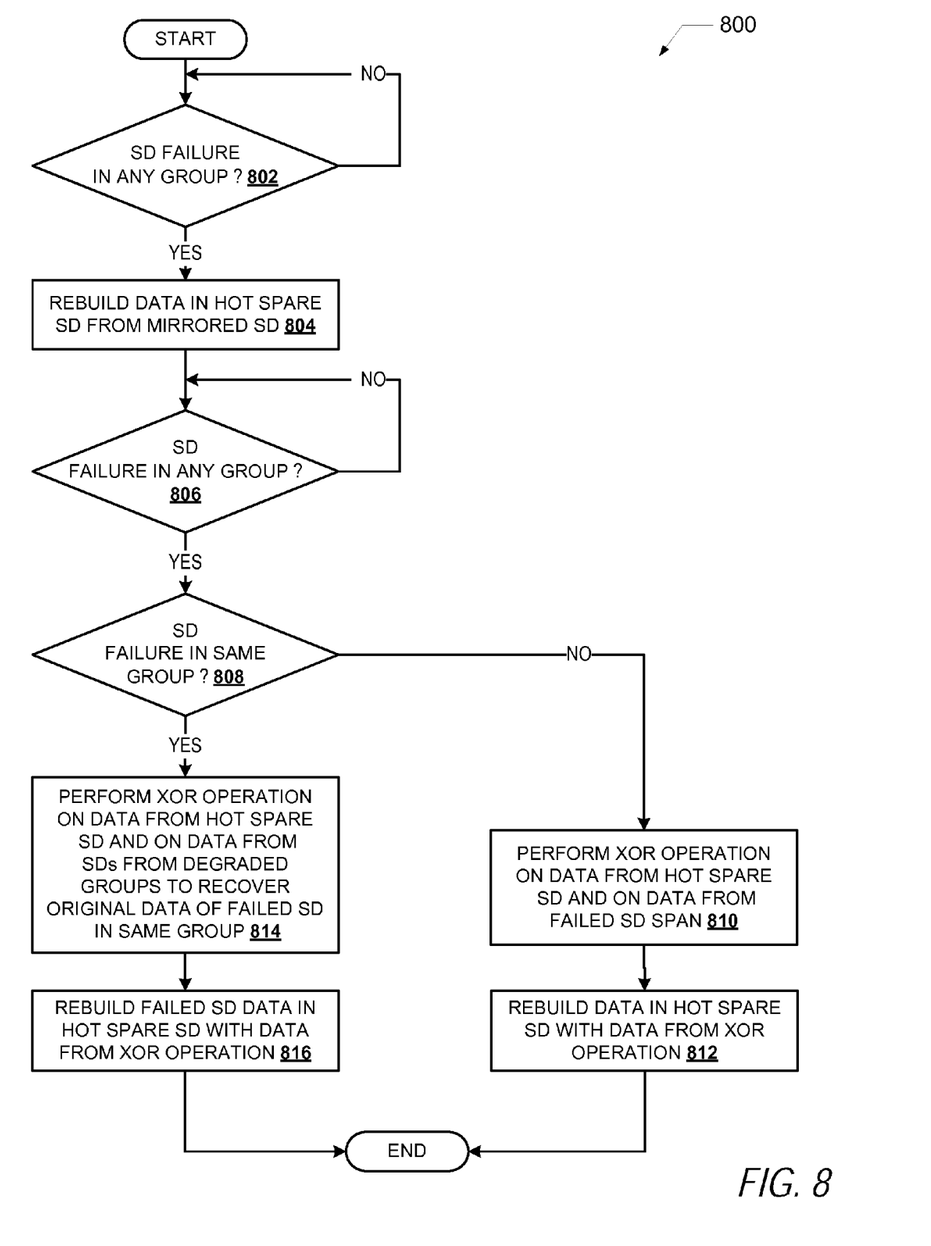
FIG. 8 is a flow chart illustrating one example of the method by which data is rebuilt in a hot spare storage device when multiple storage devices fail in a storage system, according to one or more embodiments.
Figure 9:
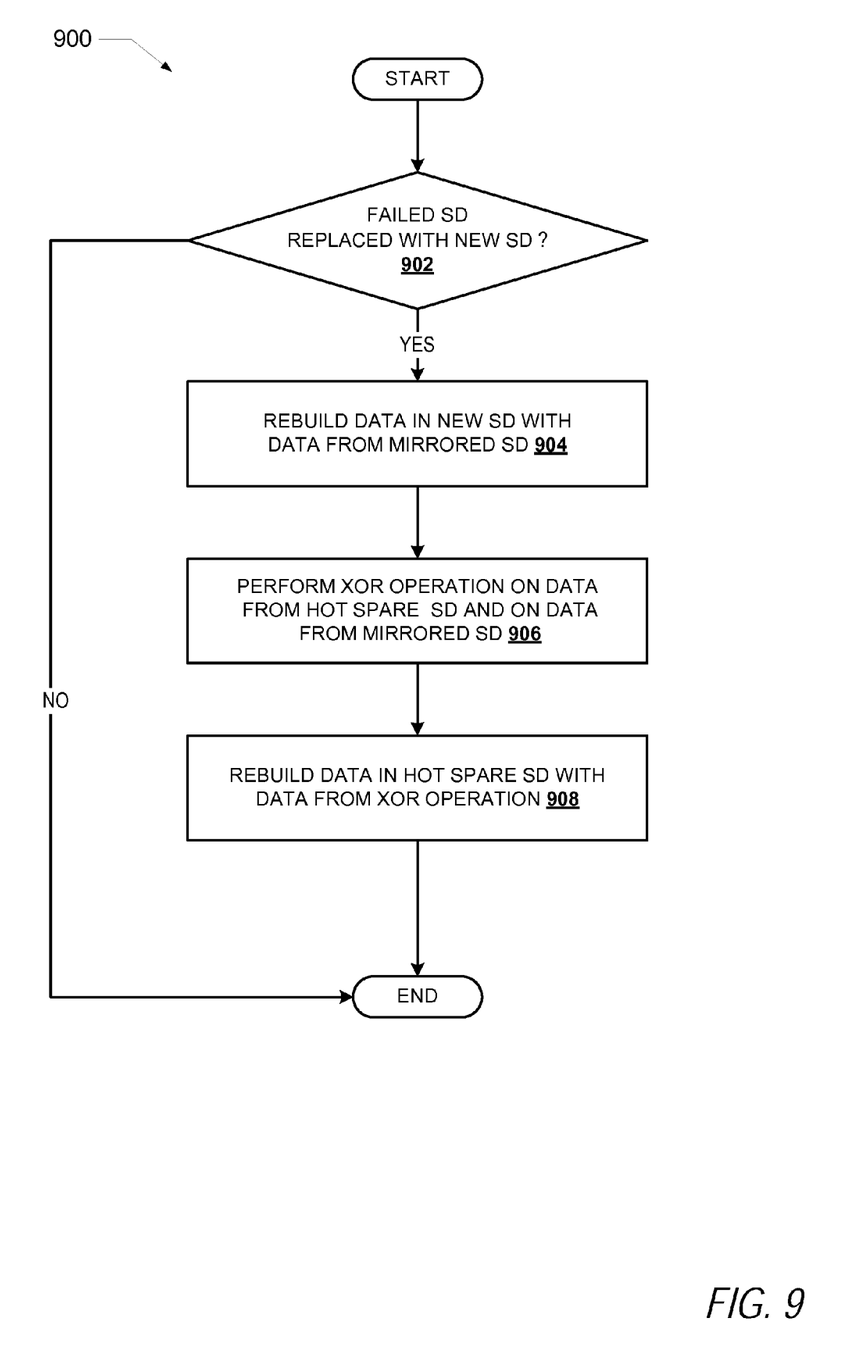
FIG. 9 is a flow chart illustrating one example of the method by which data is rebuilt in a hot spare storage device after a failed storage device has been replaced with a new storage device, according to one or more embodiments.

FIGS. 8 and 9 illustrate flowcharts of exemplary methods by which IHS 100 and storage controller 122 presented within the preceding figures, perform different aspects of the processes that enable one or more embodiments of the disclosure. Generally, method 800 represents a storage controller implemented method to rebuild data in a hot spare storage device when multiple storage devices fail in a storage system. Method 900 represents a method to rebuild data in a hot spare storage device after a failed storage device has been replaced with a new storage device.

The description of each method is provided with general reference to the specific components illustrated within the preceding FIGS. 1-7. Generally each method is described as being implemented via storage controller 122 and control logic 212 and particularly the execution of code provided by hot spare manager firmware 216 acting within storage controller 122. It is however appreciated that certain aspects of the described methods may be implemented via other processing devices and/or execution of other code.

Referring to FIG. 8, method 800 begins at the start block and proceeds to decision block 802 where storage controller 122 determines if a SD in any group or span (span 1 230, span 2 330 or span 3 350) in storage system 300 has failed. In response to none of the SD having failed, storage controller 122 continues to determine if a SD has failed at decision block 802. In response to a SD (i.e., SD 2 234) in storage system 300 failing, storage controller 122 rebuilds data 1c 260 in the hot spare SD 240 as data 4 370 from a copy of the data (data 1 250) stored in mirrored SD 1 232 (block 804). Data 4 370 stored in hot spare SD 240 now contains the same data as the failed storage device.

Storage controller 122 determines if one or more SDs in span 1 230, span 2 330 or span 3 350 in storage system 300 has failed (decision block 806). In response to none of the SD having failed, storage controller 122 continues to determine if another SD has failed at decision block 806. In response to one or more SD (i.e., SD 3 332 and SD 6 354) in storage system 300 failing, storage controller 122 determines if any of the failed storage devices are in the same group or span as the previous SD failure (decision block 808). In response to the failed SD not being in the same group or span as the previous SD failure, storage controller 122 generates parity data 6 520 by performing a second XOR operation 510 with data 5 420 (FIG. 4) previously rebuilt in hot spare SD 240 and a copy of the data (data 3 360) stored in mirrored SD 5 352 (block 810). The storage controller 122 rebuilds the resulting parity data 6 520 in hot spare SD 240 (block 812). XOR operation 510 removes any data that are redundant between SD 1 232 (data 1 320), SD 4 334 (data 2c342) and SD 5 352 (data 3 360). After the rebuilding operation, parity data 6 520 stored in hot spare SD 240 now contains parity data and storage controller 122 is able to recover the original data from the failed SDs, SD 2 234, SD 3 332, and SD 5 352 with no duplication of data. Storage controller 122 can access the data from the failed storage devices via hot spare SD 240. Method 800 then ends.

In response to the failed SD being in the same group or span as the previous SD failure at decision block 808, storage controller 122 generates data 7 630 by performing a third XOR operation 610 with data 1 320 stored in SD 1c 232 and data 3 360 stored in SD 5 352. Data 8 640 is then generated by performing a fourth XOR operation 620 with data 7 630 from XOR operation 610 and data 6 520 (FIG. 5) previously rebuilt in hot spare SD 240 (block 814). The storage controller 122 rebuilds the resulting data 8 640 in hot spare SD 240 (block 816). XOR operations 610 and 620 generates data 8 640 that contains parity data of the failed SDs (SD 2 234 and SD 6 354) from the available SDs (SD 1 232 and SD 5 352) in span 1 230 and span 3 350. Data 8 640 also contains data 2 340 from failed span 2 330. After the rebuilding operation, data 8 640 stored in hot spare SD 240 now contains the same data as the failed SD's in span 2 330 (i.e. SD 3 332 & SD 4 334) Data 8 640 stored in hot spare SD 240 serves as the degraded span, i.e. Span 2 330. Method 800 is able to recover original data of a failed virtual disk and prevents complete failure of a virtual disk upon one more storage device failures from a degraded state. Method 800 then terminates.

Turning to FIG. 9, method 900 begins at the start block and proceeds to decision block 902 where storage controller 122 determines if a failed SD (i.e., SD 3 332) has been replaced with a new functional SD (i.e., SD 7 710). In response to the failed SD not having been replaced with a new SD, method 900 ends. In response to the failed SD having been replaced with a new SD, storage controller 122, copies data 2c 342 stored in SD 4 334 to SD 7 710 as data 2 720 (block 904). The storage controller 122 generates data 9 740 by performing a fifth XOR operation 730 with data 6 520 (FIG. 5) previously rebuilt in hot spare SD 240 and data 2c 342 stored in mirrored SD 4 334 (block 906). The storage controller 122 rebuilds the resulting data 9 740 in hot spare SD 240 (block 908), XOR operation 730 removes data 2c 342 from hot spare SD 240, since data 2c is now redundant in both of SD 7 710 and SD 4 334 of span 2 330. Hot spare SD 240 now only holds parity data of the degraded spans (i.e., span 1 230 and span 3 350) as the data in span 2 330 is now mirrored and no longer degraded. Hot spare SD 240 holds only the parity data of the degraded spans, (i.e. span 1 230 & span 3 350 and excluding the data of span 2 330 data for parity calculation as span 2 becomes optimal). Method 900 then ends.

In one embodiment, methods 800 and 900 of using a hot spare SD 240 can be extended to include multiple storage subsystems 200 having multiple storage controllers 122 each of which include at least one hot spare storage device supporting redundant RAID levels for recovery of data from failed SDs and preventing complete failure of any particular RAID level.

In another embodiment, several storage systems 200 each can be in communication with processor(s) 105. Each of the storage systems include the storage devices 120, the hot spare storage device 240 and the storage controller 122 such that the information handling system 100 supports preventing loss of data from redundant RAID levels.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of operating a redundant array of independent drives (RAID) storage system having a plurality of storage devices and a hot spare storage device, the method comprising:
   a storage controller determining if a first storage device storing first data has failed within a first group of storage devices;
   in response to the first storage device failing, rebuilding the first data in the hot spare storage device from a copy of the first data stored in a first mirrored storage device of the first group of storage devices;
   determining if a second storage device storing second data has failed within a second group of storage devices;
   in response to the second storage device failing, generating third data by performing a first exclusive or (XOR) operation with the first data stored on the hot spare storage device and a copy of the second data stored in a second mirrored storage device of the second group of storage devices; and
   rebuilding the third data in the hot spare storage device, wherein the hot spare storage device stores the rebuilt third data by overwriting the existing data and holds parity data of any of the failed storage devices.

2. The method of claim 1, wherein performing the first XOR operation removes duplicated data from the first data and the second data such that the third data stored on the hot spare storage device does not contain duplicated data.

3. The method of claim 1, further comprising:
determining if a third storage device storing fourth data has failed within a third group of storage devices;
in response to the third storage device failing, generating fifth data by performing a second XOR operation on a copy of the fourth data from a third mirrored storage device of the third group of storage devices and the third data stored on the hot spare storage device; and
rebuilding the fifth data in the hot spare storage device.

4. The method of claim 3, further comprising:
determining if the second mirrored storage device storing the second data has failed;
in response to the second mirrored storage device failing, performing a third XOR operation on the first data and the fourth data to generate sixth data;
regenerating the second data by performing a fourth XOR operation on the sixth data and the fifth data from the hot spare storage device; and
rebuilding the second data in the hot spare storage device.

5. The method of claim 1, further comprising:
determining if at least one of the failed second storage devices has been replaced with a new storage device; and
in response to at least one of the failed storage devices having been replaced with a new storage device, copying the first data from the first mirrored storage device or the second data from the second mirrored storage device to the new storage device.

6. The method of claim 5, further comprising:
performing a fifth XOR operation on the third data from the hot spare storage device and the first or second data from the new or its mirrored storage device to generate seventh data; and
rebuilding the seventh data in the hot spare storage device.

7. The method of claim 1, further comprising:
copying the first data from the first storage device to the first mirrored storage device.

8. A redundant array of independent drives (RAID) storage system comprising:
a plurality of storage devices;
a hot spare storage device;
a storage controller coupled to the storage devices and the hot spare storage device for controlling storage operations, wherein the storage controller comprises logic that:
determines if a first storage device storing first data has failed within a first group of storage devices;
in response to the first storage device failing, rebuilds the first data in the hot spare storage device from a copy of the first data stored in a first mirrored storage device of the first group of storage devices;
determines if a second storage device storing second data has failed within a second group of storage devices;
in response to the second storage device failing, generates third data by performing a first exclusive or (XOR) operation with the first data stored on the hot spare storage device and a copy of the second data stored in a second mirrored storage device of the second group of storage devices; and
rebuilds the third data in the hot spare storage device, wherein the hot spare storage device stores the rebuilt third data by overwriting the existing data and holds parity data of any of the failed storage devices.

9. The storage system of claim 8, wherein performing the first XOR operation removes duplicated data from the first data and the second data such that the third data stored on the hot spare storage device does not contain duplicated data.

10. The storage system of claim 8, wherein the storage controller further comprises logic that:
determines if a third storage device storing fourth data has failed within a third group of storage devices;
in response to the third storage device failing, generates fifth data by performing a second XOR operation on a copy of the fourth data from a third mirrored storage device of the third group of storage devices and the third data stored on the hot spare storage device; and
rebuilds the fifth data in the hot spare storage device.

11. The storage system of claim 10, wherein the storage controller further comprises logic that:
determines if the second mirrored storage device storing the second data has failed;
in response to the second mirrored storage device failing, performs a third XOR operation on the first data and the fourth data to generate sixth data;
regenerates the second data by performing a fourth XOR operation on the sixth data and the fifth data from the hot spare storage device; and
rebuilds the second data in the hot spare storage device.

12. The storage system of claim 8, wherein the storage controller further comprises logic that:
determines if at least one of the failed second storage devices has been replaced with a new storage device; and
in response to at least one of the failed storage devices having been replaced with a new storage device, copies the first data from the first mirrored storage device or the second data from the second mirrored storage device to the new storage device.

13. The storage system of claim 12, wherein the storage controller further comprises logic that:
performs a fifth XOR operation on the third data from the hot spare storage device and the first or second data from the new or its mirrored storage device to generate seventh data; and
rebuilds the seventh data in the hot spare storage device.

14. The storage system of claim 8, wherein the storage controller further comprises logic that:
copies the first data from the first storage device to the first mirrored storage device.

15. An information handling system comprising:
one or more processors;
a storage system in communication with the processor, the storage system comprising:
a plurality of storage devices;
a hot spare storage device; and
a storage controller coupled to the storage devices, and the hot spare storage device, the storage controller having firmware executing thereon to provide control of storage system operations wherein the firmware configures the storage controller to:
determine if a first storage device storing first data has failed within a first group of storage devices;
in response to the first storage device failing, rebuild the first data in the hot spare storage device from a copy of the first data stored in a first mirrored storage device of the first group of storage devices;
determine if a second storage device storing second data has failed within a second group of storage devices;

in response to the second storage device failing, generate third data by performing a first exclusive or (XOR) operation with the first data stored on the hot spare storage device and a copy of the second data stored in a second mirrored storage device of the second group of storage devices; and rebuild the third data in the hot spare storage device, wherein the hot spare storage device stores the rebuilt third data by overwriting the existing data and holds parity data of any of the failed storage devices.

16. The information handling system of claim 15, wherein performing the first XOR operation removes duplicated data from the first data and the second data such that the third data stored on the hot spare storage device does not contain duplicated data.

17. The information handling system of claim 15, wherein the firmware further configures the storage controller to:

determine if a third storage device storing fourth data has failed within a third group of storage devices;

in response to the third storage device failing, generate fifth data by performing a second XOR operation on a copy of the fourth data from a third mirrored storage device of the third group of storage devices and the third data stored on the hot spare storage device; and rebuild the fifth data in the hot spare storage device.

18. The information handling system of claim 17, wherein the firmware further configures the storage controller to:

determine if the second mirrored storage device storing the second data has failed;

in response to the second mirrored storage device failing, perform a third XOR operation on the first data and the fourth data to generate sixth data;

regenerate the second data by performing a fourth XOR operation on the sixth data and the fifth data from the hot spare storage device; and rebuild the second data in the hot spare storage device.

19. The information handling system of claim 15, wherein the firmware further configures the storage controller to:

determine if at least one of the failed second storage devices has been replaced with a new storage device; and in response to at least one of the failed storage devices having been replaced with a new storage device, copy the first data from the first mirrored storage device or the second data from the second mirrored storage device to the new storage device. .

20. The information handling system of claim 19, wherein the firmware further configures the storage controller to:

perform a fifth XOR operation on the third data from the hot spare storage device and the first or second data from the new or its mirrored storage device to generate seventh data; and rebuild the seventh data in the hot spare storage device.

21. The information handling system of claim 15, wherein the firmware further configures the storage controller to:

copy the first data from the first storage device to the first mirrored storage device.

22. The information handling system of claim 15 further comprising:

a plurality of storage systems each in communication with the processor, each of the storage systems including the plurality of storage devices, the hot spare storage device and the storage controller such that the information handling system supports preventing loss of data from redundant RAID levels.

* * * * *